Figure 1:
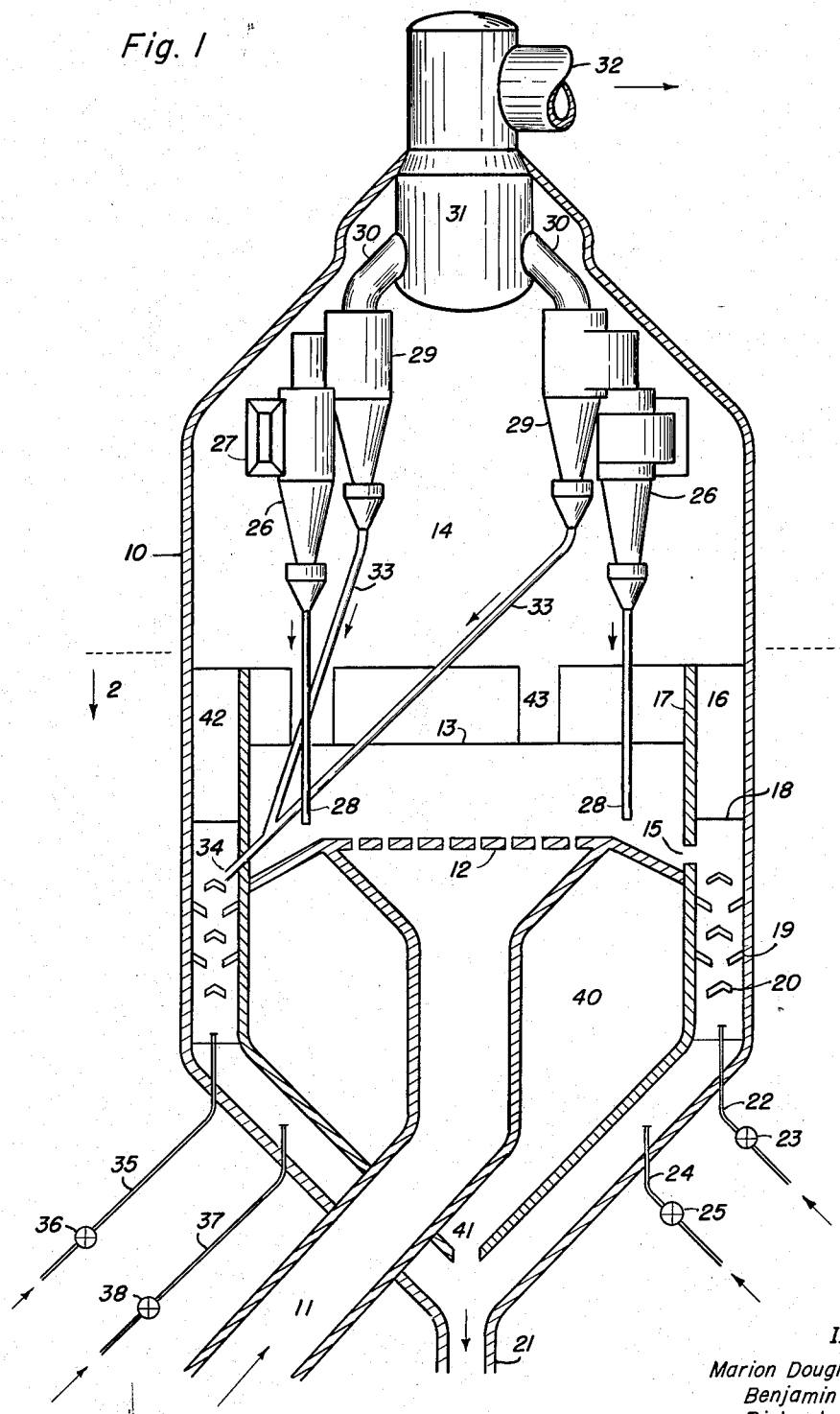

Dec. 27, 1955    M. D. CUNNINGHAM ET AL    2,728,642
GAS-SOLIDS CONTACTING APPARATUS
Filed June 9, 1952    2 Sheets-Sheet 1

INVENTORS
Marion Douglas Cunningham
Benjamin G. Jones
Richard H. Wulzen
BY Thomas G. Bell
AGENT Dec. 27, 1955  M. D. CUNNINGHAM ET AL  2,728,642
GAS-SOLIDS CONTACTING APPARATUS
Filed June 9, 1952  2 Sheets-Sheet 2

INVENTORS
Marion Douglas Cunningham
Benjamin G. Jones
Richard H. Wulzen
BY
AGENT United States Patent Office 2,728,642
Patented Dec. 27, 1955

2,728,642
GAS-SOLIDS CONTACTING APPARATUS

Marion Douglas Cunningham and Benjamin G. Jones, Concord, and Richard H. Wulzen, Walnut Creek, Calif., assignors to Tide Water Associated Oil Company, San Francisco, Calif., a corporation of Delaware Application June 9, 1952, Serial No. 292,516

8 Claims. (Cl. 23—288)

This invention relates to structural improvements in catalytic cracking apparatus of the so-called "fluid" type wherein gases are contacted with pulverized solids maintained in a fluidized bed by passage therethrough of gases under suitable cracking conditions. In particular, the invention deals with improved apparatus designed to more effectively strip hydrocarbons from catalyst particles prior to the removal of said particles from the reaction vessel into the regeneration zone while effectively suppressing an undesirable accumulation of fine particles of catalyst in said reaction vessel. More particularly, the present invention relates to a combination of structural elements comprising an efficient type of stripping means, cyclone separator, and cyclone "dip-leg."

In the powdered or fluid-type catalyst system a powdered catalyst effects a conversion while suspended in a hydrocarbon vapor stream. It is then separated from the hydrocarbon vapors and suspended in a gas mixture for regeneration. The catalyst so regenerated is then separated from regeneration gases and resuspended in the hydrocarbon vapor stream for effecting further conversion. To remove entrained solids from the gases leaving the contacting vessel, it is common practice to provide within said vessel one or more cyclone separators through which the gases are forced before being discharged from said vessel. Solids removed from the effluent gases by the cyclones are returned through a pipe, commonly referred to as a "dip-leg," to the fluid bed. In conventional arrangements, the dip-leg extends below the surface of the bed in order to provide a seal against gases which might otherwise be blown upwardly in the dip-leg and prevent proper action of the cyclone. Various arrangements of cyclones and dip-legs are now in use. In some installations cyclones in multiple are used discharging solids into a common dip-leg. In others, cyclones in series, or series-parallel, are used with individual dip-legs.

Furthermore, in the catalytic conversion of hydrocarbons the finely divided contact particles become fouled and must be removed from the reaction zone for regeneration. On withdrawal from the reaction zone, the contact particles entrain vaporous reaction products which are usually removed by a stripping step. The contact particles are stripped with a stripping gas, such as steam, flue gas, inert gases, etc. If the vaporous reaction products are not removed from the mixture of contact particles, they pass with the contact particles to the regeneration zone where they are burned. This burning may result in unduly high temperatures with the accompanying loss of valuable hydrocarbon materials. Combustion of these vaporous products requires extra air compression, larger vessels, etc., without increasing correspondingly the catalytic cracking capacity of the plant. With proper stripping, the entrained reaction products are removed from the catalyst leaving the reaction zone and are not lost by burning in the regeneration zone.

In the newer type of catalytic conversion units for hydrocarbons, catalyst or contact particles are removed as a dense fluidized liquid-simulating mixture from the reaction zone, and it has been difficult to obtain efficient stripping of the contact particles in these units. One of the newest and most effective stripping means comprises an annular space or stripping zone formed between the inner wall of the reaction vessel and the outer wall of a vertically arranged elongated annular baffle positioned in the lower portion of the reaction vessel and in sealed relationship with a feed inlet distribution plate. The annular space may be divided horizontally in decks or levels by means of baffles or perforated plates provided for supporting the catalyst particles at various heights and appropriate thickness of layers. As the spent catalyst moves downwardly through the annular space or stripping zone of the reaction vessel and over the baffle plates suspended therein, a stripping medium is introduced into the lower portion of the stripping zone countercurrently to the flow of spent catalyst thereby stripping the volatile material from said catalyst. Various structural modifications of this type of stripping means are now in use and one particularly efficient embodiment comprises a cellular arrangement wherein the annular stripping zone is divided into a series of vertical cells whereby the inherent advantages of a reduced cross sectional area of contact is provided while stripping action throughout the full height of the stripping zone is purposely retained. This type of stripping means is hereinafter referred to as a "cellular stripper." The overall efficiency of the stripping operation may be increased by as much as 50% through the use of a cellular stripper, as compared to earlier stripping arrangements, resulting in increased cracking capacity. Consequently, the use of an internal stripper of the cellular type is now well integrated with catalytic cracking operations.

In the operation of catalytic apparatus containing the cellular type of stripper considerable difficulty is encountered with respect to the accumulation, or build-up, in the reaction vessel of catalyst "fines" (i. e. those catalyst particles having diameters of about 20 microns and less). Due to the greater stripping action of the cellular type of stripper, the catalyst fines have an increased tendency toward being carried out of the stripping zone by the stripping fluid. These fines are then carried back to the cyclones along with the stripping fluid where they are reseparated, returned to the catalyst bed and again removed by the stripping fluid. It is evident that a point will be reached, as operations continue, where the proportion of fines to coarser particles separated by the cyclones greatly exceeds the proportion of fines in the original catalyst. This results in an excessive load upon the cyclones. Likewise, these fines which are thus recirculated between the stripper and cyclones remain in the reaction zone for an excessive time before they ultimately find their way out to the regenerator and, as a result, become heavily coated with carbon and ineffective as a catalyst. The present invention provides means whereby the recirculation of these fines between the stripper and cyclones can be minimized, thereby substantially reducing the load on the cyclones and increasing the overall efficiency of the catalytic operations.

Now, according to the present invention, the dip-leg from one or more of the cyclones is extended directly into a preselected section (or sections) of the cellular stripper, said section or cell being so modified as to accommodate the admission of fines from said dip-leg and to permit separately controlled stripping whereby recirculation of catalyst fines may be greatly reduced. When the cyclones are arranged in series, the first stage of separation removes the bulk of the average size particles which may be returned to the bed level without great difficulty. In such an arrangement, a preferred embodiment of the present invention comprises a modified dip-leg for the cyclones in the secondary or later stages of separation only, wherein the particles separated are predominantly fines. The invention, therefore, contemplates an internal conduit adapted to provide a direct feed of catalyst particles from an appropriate cyclone into a preselected cell or portion of the cellular stripper in which the stripping fluid is controllably admitted in such a manner that the fines do not accumulate and recirculate in the reaction chamber but instead pass directly into the regeneration zone after the stripping operation is completed. Suitable stripping fluids such as steam, oxygen-free flue gas, carbon dioxide, and nitrogen may be used; but preferably saturated or superheated steam is introduced into the stripping zone, usually near the bottom and in a single or plurality of controllable inlets.

In order to illustrate the invention and for the purpose of disclosing more fully its nature and purposes, the accompanying drawings set forth a form and arrangement of apparatus elements embodying the invention and applicable to a typical catalytic cracking process. Figure 1 represents the side view of a reaction vessel with cyclone and cellular stripper arranged in accordance with the present invention, and, Figure 2 represents a sectional plan view of said vessel as viewed from above the line 2—2 of Figure 1.

Figure 2:
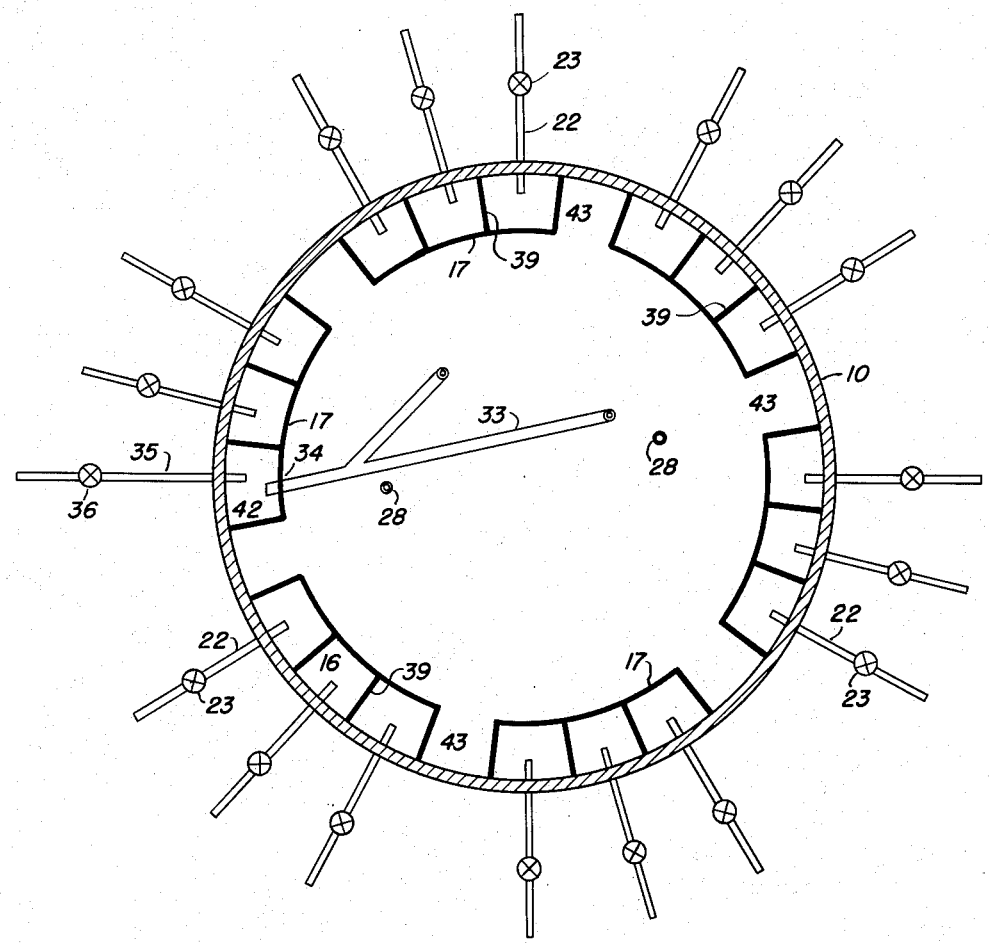

Referring in detail to Figures 1 and 2, 10 represents a typical reaction vessel suitable for catalytic cracking processes. Conduit 11 is provided for the admission of a fluidized mixture of hydrocarbons and catalyst through grid 12 and thence through catalyst bed level 13 in reaction zone 14. Orifices 15 are provided for the return of spent catalyst into each of several annularly arranged stripping cells 16 conveniently fabricated in groups of three and formed by baffle 17 in conjunction with the wall of the reaction vessel and vertical spacings 43 interspersed therebetween. 18 represents the level of catalyst in stripping cells 16 and 19 and 20 represent "doughnut" and "disc" stripping decks respectively. Outlet 21 is provided for the return of stripped catalyst to the regeneration zone. Conduits 22 provide for the admission to cells 16 of stripping fluid as controlled by valves 23. Conduits 24 and valves 25 represent additional stripping means for cells 16 if such are desired.

The primary stages of conventional type cyclone separators are represented by 26 wherein 27 represents the orifices through which the fluidized mixture of vapors and catalyst is admitted. 28 represents the primary dip-legs through which the coarser particles leave the separator system into the catalyst bed below. Partially separated mixtures of hydrocarbons and catalyst particles are expelled through the upper portion of the primary cyclones into the secondary cyclones 29. The hydrocarbon products, after separation from catalyst particles, are passed through conduits 30 into the plenum 31 and thence through exhaust outlet 32 to other refinery units for further processing. Conduits or modified dip-legs 33 provide for the flow of fine particles of separated catalyst through baffle 17 at connection 34 into cell 42, a preselected portion or portions of the cellular stripper. For this purpose the inlet 34 into the cell 42 replaces the usual orifice 15 so as to seal off the main body of catalyst from cell 42. Conduit 35 provides for admission of stripping fluid into the preselected cell and valve 36 is provided for external control of the stripping fluid. Additional conduit 37 and valve 38 represent alternative or additional stripping means for cell 42 as required. 39 represents vertically interspersed dividing members between the individual stripping zones or cells and 40 represents the space below the reaction zone and catalyst bed which space is provided with vent 41 to prevent accumulation of finely divided particles in said space. For construction reasons it may be advantageous to arrange cells 16 in units with spacings 43 between the units. As illustrated in the drawings each unit consists of three cells; however, each unit may comprise any number of cells as desired. In this manner each unit can be placed in position individually and spacings 43 provide for relieving temperature stresses.

It will be appreciated that while Figures 1 and 2 represent one particular embodiment of the present invention, other possible structural arrangements will suggest themselves to those skilled in the art of catalytic refining. For example, several cyclone separators may be employed in the reaction vessel and these separators may have one or more stages with appropriate conduits or modified dip-legs leading into one or more cells of the cellular stripper. The modified dip-legs may be interconnected prior to their attachment through baffle 17 into the preselected cell or cells of the stripping zone, or alternatively, each modified dip-leg may be attached directly to said cell or cells. Furthermore, the length and cross sectional area of said conduits may be adapted to the particular separator dip-leg and/or cellular stripper structure involved, depending on the overall characteristics of the reaction chamber and type of catalyst particles used in the process. Also, the orifices permitting flow of catalyst into the stripping zones may be positioned as desired along the internal baffle up to the height of bed level, and more than one orifice may be used when desired. Furthermore, the spacings 43 may be omitted in whole or in part should more stripping cells be desired.

In catalytic refining, such as in the case of catalytic cracking, charge stock mixed with hot fluidized catalyst from a regeneration zone is injected into reaction chamber 10 from inlet conduit 11 entering the lower portion of reaction chamber 10. This mixture passes upwardly through an expanding conical member and perforated plate or grid arrangement 12, and thence into the reaction zone 14, where the predominant part of the catalyst settles to form a fluidized bed having upper level 13. The catalyst bed is in the form of a fluidized powdered mass which is kept constantly in motion by passage of the charge stock therethrough. Under increased temperature supplied by the hot regenerated catalyst the continuous catalytic reaction takes place. The reaction products along with entrained catalyst are withdrawn from the reaction zone into the primary cyclone separators 26. In this primary separation phase, the bulk of the entrained catalyst, and particularly the larger and average size particles, is freed from admixture with the hydrocarbon products by centrifugal force in the cyclones and is released through dip-legs 28 to a position underneath the catalyst bed level 13.

It is very important that each dip-leg extend well below the level 13 of dense-phase or settled catalyst in order that said settled catalyst may form a seal for the dip-legs, even when the catalyst level is relatively low. Should this seal be interrupted, the vapors might enter the respective cyclones through the dip-legs 28 instead of through the tangential inlets 27 and thus nullify the beneficial effects of the cyclone separators.

In accordance with the present invention, the dip-legs from a stage or stages of separation are attached directly to one or more preselected portions of the cellular stripping unit in lieu of merely extending beneath the catalyst bed level generally. A preferred embodiment comprises attaching the dip-legs 33 from the secondary or tertiary stage separators to said preselected cell or cells. While merely returning the catalyst to the bed level is generally satisfactory when dealing with the average size or coarser particles separated by the primary cyclones, the fines separated in the last stage of cyclones are passed directly to the stripper, and separately stripped, without being mixed with the main body of catalyst.

The catalyst particles which settle in the bed flow from the lower portion of the bed through orifices 15 into the stripping zone. Of course, some catalyst may also be blown into the stripping zone over the separating baffle 17, and is stripped along with the rest of the catalyst prior to transfer to the regeneration zone.

The present invention provides for direct admission of fines from the cyclones into certain preselected cells 42 of the cellular stripper without passage in combination with the main body of catalyst through orifices 15 in the conventional manner. These preselected cells 42 are provided with individual stripping fluid inlets 34 whereby the admission of said fluid may be constrained to an operable minimum, thereby insuring against the fines being needlessly carried back to the reaction zone while still providing sufficient stripping to prevent loss of valuable hydrocarbon products.

The reaction products are finally expelled through the outlet 32 in the upper portion of the reaction vessel and then transferred to other units for further refining and processing. The entire operation is generally maintained on a continuous basis with provision for replenishment of catalyst when necessary or desirable, as well as for changes in charge stocks or degree of reaction, as needed.

While a specific example of the present invention has been described herein in detail, it should be understood that said invention is not to be limited to specific arrangements or details since many modifications will be apparent to those skilled in the art. For example, the present invention should not be limited in scope to cracking operations exclusively, nor should it be restricted to use in a reaction vessel alone. Various other processes may derive benefits from the addition of the structural improvements suggested herein as, for example, operations involving the separation of solid particles from vaporous materials with which they may be entrained.

We claim:

1. An apparatus adapted for contacting finely divided solids and gases, comprising a vessel adapted for contacting gaseous fluids and solid particles and adapted to contain a fluidized bed of solid particles and having a top outlet for gaseous fluid and a bottom outlet for said solid particles, an inlet conduit provided with an expanding conical member provided at its upper end with a horizontally extending perforated plate and arranged in the lower portion of said vessel, a series of vertically extending stripping cells annularly arranged adjacent the inner wall of said vessel and extending above and below and in sealed relationship with said plate, at least one cyclone separator located in the upper portion of said vessel and connected to said top outlet adapted to remove entrained solids from gases entering said top outlet and having a dip-leg for solids separated therein, and a conduit connecting at least one of the dip-legs to at least one of said cells at a point intermediate the top and bottom of such cells, means for supplying a controlled amount of stripping gas to the lower end of such cells, means for transferring solids from said bed to the remaining cells only and separately controlled means for supplying stripping gas to the lower end of said remaining cells.

2. An apparatus according to claim 1 wherein the stripping cells contain a plurality of vertically spaced substantially horizontal stripping decks positioned in the lower portion thereof.

3. An apparatus according to claim 1 wherein the means for transferring solids from the bed to the remaining cells comprises an orifice located in the wall between each such cell and the catalyst bed.

4. An apparatus according to claim 1 wherein the stripping cells extend above the normal catalyst bed level.

5. An apparatus according to claim 1 wherein the stripping cells are in the form of an annular ring and are separated from each other by vertical radial partitions within said ring.

6. An apparatus according to claim 1 wherein the stripping cells are arranged in units spaced apart from each other and comprising at least two cells per unit.

7. An apparatus according to claim 1 which comprises more than one cyclone arranged in series, and the dip-leg from the last cyclone of the series is connected by means of a conduit to at least one of the stripping cells.

8. In an apparatus of the character described which includes, in combination, a vessel adapted to contain a fluidized bed of solid particles and for contacting gaseous fluid and said solid particles and having a top outlet for gaseous fluid and a bottom outlet for solid particles, an inlet member extending into said vessel for admitting solid particles and gaseous fluid feed into a contacting section of said vessel, a series of vertical cells arranged substantially symmetrically adjacent the inner wall of said vessel in sealed contact with the periphery of said inlet member and extending a distance above and a distance below the point of said contact, at least one cyclone separator located in said vessel and connected to said top outlet for removing entrained solids from gases entering said outlet and a dip-leg attached to said cyclone for transfer of solids separated therein, the improvement which comprises a conduit connecting at least one of said dip-legs to at least one of said cells at a point above said point of contact, means for supplying a controlled amount of stripping fluid to the lower end of such cells, means for transferring solids from said bed to the remaining cells only and separately controlled means for supplying stripping fluid to the lower end of said remaining cells.

References Cited in the file of this patent

UNITED STATES PATENTS

| | | |
|---|---|---|
| 2,488,029 | Scheineman | Nov. 15, 1949 |
| 2,488,030 | Scheineman | Nov. 15, 1949 |
| 2,514,288 | Nicholson | July 4, 1950 |
| 2,518,693 | Jahnig | Aug. 15, 1950 |
| 2,612,433 | Nicolai et al. | Sept. 30, 1952 |
| 2,612,437 | Kaulakis et al. | Sept. 30, 1952 |